(12) United States Patent
Lawrence et al.

(10) Patent No.: US 7,265,821 B1
(45) Date of Patent: Sep. 4, 2007

(54) CASTER ANGLE MEASUREMENT SYSTEM FOR VEHICLE WHEELS

(75) Inventors: Jon D Lawrence, Grand Rapids, MI (US); Munir T Ozdemir, Grand Rapids, MI (US); Hilbrand J Sybesma, Plainwell, MI (US); James R Lehman, Potterville, MI (US)

(73) Assignee: Burke E. Porter Machinery Company, Grand Rapids, MI (US)

( * ) Notice: Subject to any disclaimer, the term of this patent is extended or adjusted under 35 U.S.C. 154(b) by 161 days.

(21) Appl. No.: 10/973,356

(22) Filed: Oct. 26, 2004

Related U.S. Application Data

(60) Provisional application No. 60/515,734, filed on Oct. 29, 2003.

(51) Int. Cl.
*G01B 11/26* (2006.01)
(52) U.S. Cl. .................... 356/139.09; 356/155
(58) Field of Classification Search .......... 356/139.09, 356/155
See application file for complete search history.

(56) References Cited

U.S. PATENT DOCUMENTS

| | | | |
|---|---|---|---|
| 5,600,435 A | 2/1997 | Bartko et al. | 356/139.09 |
| 5,731,870 A | 3/1998 | Bartko et al. | 356/139.09 |
| 5,978,077 A | 11/1999 | Koerner et al. | 356/139.09 |
| 6,070,332 A | 6/2000 | Kane | 33/203.13 |
| 6,404,486 B1 * | 6/2002 | Nobis et al. | 356/139.09 |
| 6,580,971 B2 | 6/2003 | Bunn et al. | 700/259 |
| 6,650,022 B1 * | 11/2003 | Qi et al. | 257/797 |
| 6,710,866 B1 * | 3/2004 | Adolph | 356/139.09 |
| 6,796,035 B2 * | 9/2004 | Jahn et al. | 33/193 |
| 2003/0012572 A1 * | 1/2003 | Chapman | 396/428 |

* cited by examiner

*Primary Examiner*—Thomas H. Tarcza
*Assistant Examiner*—Tim Brainard
(74) *Attorney, Agent, or Firm*—Van Dyke, Gardner, Linn & Burkhart, LLP

(57) ABSTRACT

An apparatus and method is provided for measuring the caster angle of a steerable wheel assembly without contact with the vehicle. An image capture device, preferably a CCD type video camera or sensor, views a vehicle wheel mounting and steering assembly that is illuminated by a light source. Information from the captured image is transmitted to a computer based control, such as a computer or processor, that determines the angle of a preformed line or preselected physical features on the wheel assembly in the captured image, and determines the caster angle of the steering axis based on the fixed angular relationship of the line or physical features to the steering axis that is stored or accessed by the control. Preferably, the image capture device is mounted below the vehicle on a vehicle alignment machine that supports the vehicle.

31 Claims, 7 Drawing Sheets

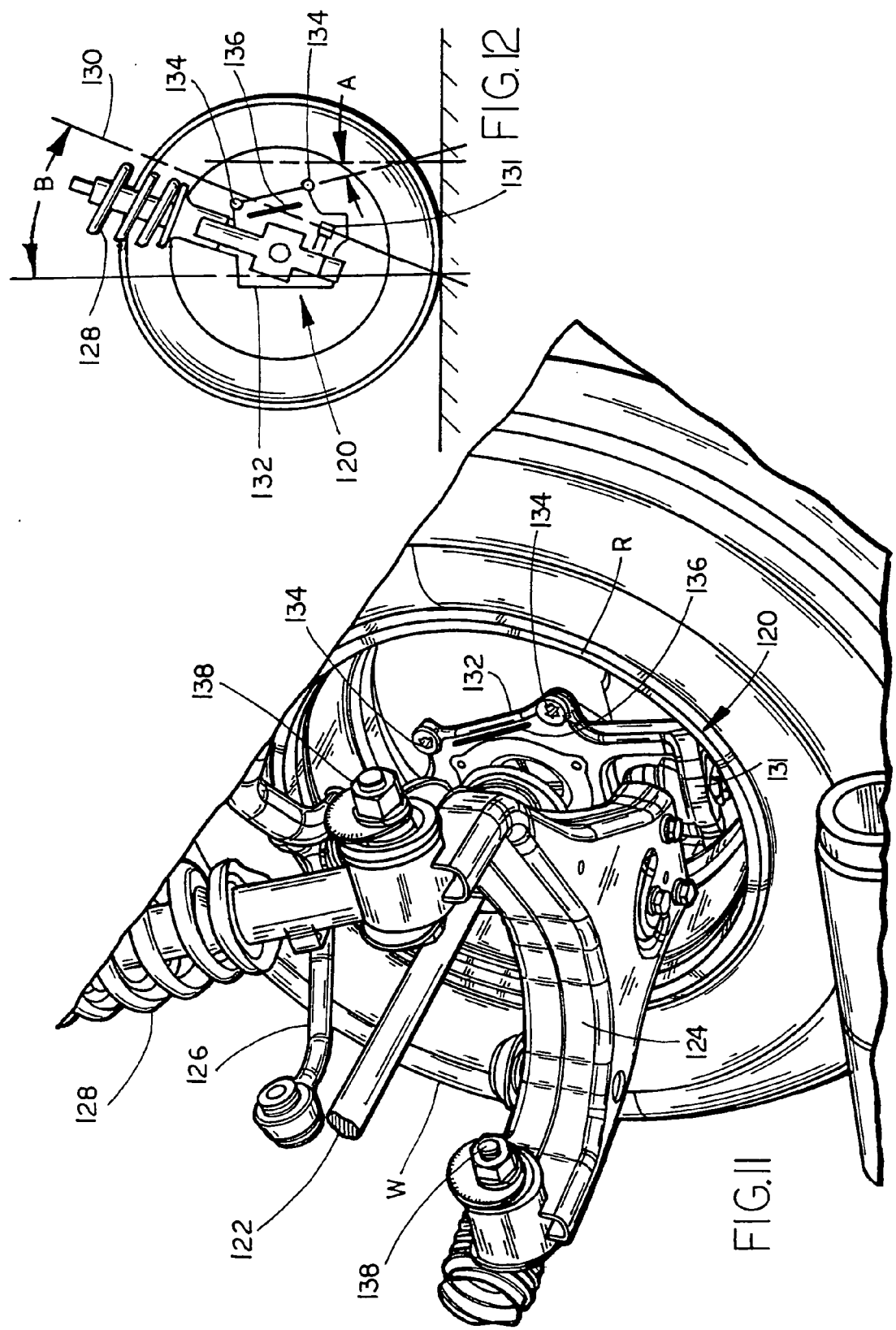

CASTER ANGLE MEASUREMENT SYSTEM FOR VEHICLE WHEELS

CROSS REFERENCE TO RELATED APPLICATION

This application claims priority on U.S. Provisional Application Ser. No. 60/515,734, filed Oct. 29, 2003, the disclosure of which is hereby incorporated by reference herein.

FIELD OF THE INVENTION

This invention relates to measurement systems for vehicle wheels and, more particularly, to a measurement system for determining the caster angle of a steerable vehicle wheel on a vehicle using an image capture device such as a closed circuit video camera system that does not require any contact with the vehicle.

BACKGROUND OF THE INVENTION

Steerable wheel assemblies for vehicles pivot around an inclined axis known as the steering axis, the position of which is determined by the joints and suspension components of the wheel and steering assembly. Proper positioning and alignment of a steerable wheel, and especially a front wheel of a vehicle, may require the setting of toe, camber angle and caster angle. Toe is the angle between the vehicle's longitudinal axis and a plane through the center of the steered wheel/tire and affects the straight ahead running of the vehicle as well as steering. Camber angle is the inclination of the wheel axis toward the road surface in a vertical plane and is negative when the top of the wheel is inclined toward the center of the vehicle. Camber angle influences lateral control and is typically moderately negative. Caster is the distance between the contact point of the wheel/tire with the road and the point at which the steering axis intersects the road as viewed from the side of the wheel. Caster determines the degree of self-centering action in the steering as well as influencing straight-line stability and steering force in curves and is typically positive, i.e., the top of the steering axis is tilted rearwardly. Caster angle is defined as the angle between the steering axis and a vertical plane, perpendicular to the longitudinal centerline of the vehicle, as viewed from the side of the vehicle. During assembly and/or repair of vehicles, it is important to measure, adjust or audit, and set the toe, as well as camber and caster angles of a steerable wheel so that the vehicle will drive and steer properly. In order to set or audit the caster, it is necessary to measure the caster angle.

In the past, caster angle was measured using various direct and indirect methods which were time consuming, labor intensive, and less accurate than desired. Direct caster angle measurement methods require human operators or mechanisms to place measurement tools in contact with the vehicle and are subject to placement error and wear. Indirect caster angle measurement methods require an operator or mechanism to turn the steering wheel of the vehicle to different positions while having the toe and camber measurements recorded after which known formulas are used to calculate the caster. This indirect method allows measurement error in each of the steering wheel positions as well as operator error and/or mechanical wear. If the toe and camber of the wheel are measured by contact methods, then additional error can be encountered. Moreover, the indirect measurement method requiring measurements at various steering wheel positions requires significant cycle time to perform thereby causing greater expense.

Therefore, a need was determined for an apparatus and method for measuring the caster angle of a wheel assembly on a vehicle during vehicle assembly or repair which would allow rapid, accurate determination of the caster angle without contact with the wheel assembly thereby allowing the caster of the wheel assembly to be properly adjusted or audited and set before the vehicle is released for sale or re-use.

SUMMARY OF THE INVENTION

Accordingly, the present invention provides a system and method for measuring the caster angle of a steerable wheel assembly on a vehicle using an image capture device such as a closed circuit video camera or sensor to view a portion of a wheel mounting and steering assembly illuminated with a light source to determine the angular position of at least one physical feature on the wheel mounting and steering assembly. The information on the position of the physical feature or features is transmitted to a computer based device that calculates the caster angle of the steering axis based on the fixed relationship of that physical feature or features to the steering axis, all without contact with the vehicle.

In one form, the invention is an apparatus for measuring the caster angle of the steering axis of a wheel assembly of a vehicle comprising an image capture device, a support for mounting the image capture device for viewing a wheel mounting and steering assembly for a wheel of a vehicle, a light source positioned to illuminate the wheel mounting and steering assembly for the wheel viewed by the image capture device, and at least one computer-based control connected to the image capture device. The image capture device is positioned to view at least one physical feature on the wheel mounting and steering assembly when illuminated with light from the light source. The image capture device provides information concerning the position of the at least one physical feature to the control, the control including software programmed to determine the position of the physical feature from the information and determine the caster angle of the steering axis from that position of the physical feature.

In preferred forms of the invention, the image capture device is a video camera and the support is adjustable whereby the position of the image capture device may be changed for viewing different areas of the wheel mounting and steering assembly and/or a wheel mounting and steering assembly of different vehicles which may be positioned for viewing by the image capture device. Preferably, the support is mounted below the vehicle for viewing the wheel assembly from a position between the vertical planes including the sides of the vehicle and is adjustable on at least three axes for proper positioning and viewing of a variety of wheel assemblies. In addition, the image capture device is preferably a closed circuit CCD video camera of the type typically used in machine vision applications.

In other aspects, the light source is preferably selected from an incandescent light, a halogen light, and at least one light emitting diode. Preferably, when the image capture device is a black and white video camera, the light source is a red light emitting diode, and more preferably, a plurality of red light emitting diodes positioned to emit light in a generally common direction.

Preferably, the software of the computer-based control is programmed to determine the angle of the at least one physical feature with respect to the position of the image capture device. Further, the control is programmed with and stores the angular relationship of the at least one physical feature on the wheel mounting and steering assembly with respect to the steering axis of the wheel assembly. The software is preferably also programmed to determine the caster angle of the wheel assembly from the angle of the physical feature based on the stored angular relationship of the physical feature to the steering axis.

In preferred forms, the physical feature viewed by the image capture device such as a video camera may be a line on the wheel mounting and steering assembly comprising at least one of 1) a line formed in a predetermined position on the wheel mounting and steering assembly that is adapted for viewing by the video camera and 2) a virtual or imaginary line extending between at least two predetermined physical features such as a pair of holes or a pair of bolts or the like on the wheel mounting and steering assembly. When the video camera views and captures an image of such a line or the physical feature or features defining such line, the programmed software of the control determines the angle of the line with respect to the position of the video camera and, thereafter, the caster angle from the angle of the line and the stored angular relationship of the viewed line or features to the steering axis provided by manufacturer's specifications for the wheel mounting and steering assembly.

In other aspects, the image capture device, support and light source may be mounted on a vehicle alignment machine adapted to receive and support a vehicle. The vehicle alignment machine preferably includes a frame for supporting a vehicle at a predetermined position above a support surface with the image capture device and support being mounted on the vehicle alignment machine below the predetermined position for viewing the wheel mounting and steering assembly from below that position and the vehicle. In other aspects, the vehicle alignment machine may include a pair of image capture devices, preferably video cameras, each being mounted on a respective support, one image capture device adjacent a right side of the alignment machine frame for viewing a wheel mounting and steering assembly on the left side of the vehicle, the second image capture device being mounted adjacent the left side of the alignment machine frame for viewing a wheel mounting and steering assembly on the right side of the vehicle. In a preferred embodiment, each image capture device is a video camera that has a field of view extending across the field of view of the other camera.

In addition, the present invention provides a method for measuring the caster angle of the steering axis of a wheel assembly of a vehicle, the method comprising providing an image capture device, illuminating the wheel mounting and steering assembly of the vehicle wheel assembly with a light source, viewing at least one physical feature on the wheel mounting and steering assembly with the image capture device when the feature is illuminated with light from the light source, and determining the position of the physical feature and the caster angle of the steering axis from an output of the image capture device.

In preferred aspects of the method, the physical feature viewed by the image capture device is a line, and the angle of the line is determined with respect to the position of the image capture device. The method further includes providing the fixed angular relationship of the line on the wheel mounting and steering assembly to the steering axis of the wheel assembly, and determining the caster angle of the wheel assembly from the angle of the line and the fixed angular relationship of the line to the steering axis.

Preferably, the method includes viewing the illuminated wheel mounting and steering assembly with a video camera positioned below the vehicle. Further, the method preferably includes positioning the video camera adjacent one side of a vehicle and viewing a wheel assembly on the opposite side of the vehicle. A second video camera adjacent the opposite side and viewing a wheel assembly on the one side may be included, especially where the video cameras are positioned such that their fields of view extend across one another.

The present invention provides significant advantages over prior known methods of measuring and calculating caster and caster angle for steerable wheel assemblies on vehicles. The present invention avoids any direct contact with the vehicle including the wheel assembly through the use of an image capture device such as a video camera and light source thereby saving considerable operator time and reducing errors based on operator measurement with the measuring tools. The image capture device is positioned in a predetermined position, and does not require movement or repositioning to measure the caster angle. In addition, the present invention requires significantly less time for obtaining the caster angle of a wheel assembly because of several reasons including the rapid camera response, the elimination of human measurement, the elimination of contact with the wheel assembly during measurement, and simultaneous measurement with other operations or measurements. Thus, operator labor required is reduced and the cost of measuring and setting or auditing caster and caster angle is lowered. Further, the invention is durable and avoids the use of moving parts and tools subject to wear thereby further reducing costs involved in caster measurement and adjustment. These and other objects, advantages, purposes and features of the invention will become more apparent from a study of the following description taken in conjunction with the drawings.

BRIEF DESCRIPTION OF THE DRAWINGS

FIG. 11 is a perspective view of a wheel mounting and support assembly of a steerable vehicle wheel from the inside of the wheel assembly as viewed by the video camera of the present invention; and FIG. 12 is a schematic view of wheel mounting and steering assembly of a typical vehicle wheel showing the angular relationships between portions of that assembly and the steering axis of the assembly.

DESCRIPTION OF THE PREFERRED EMBODIMENTS

Figure 1:
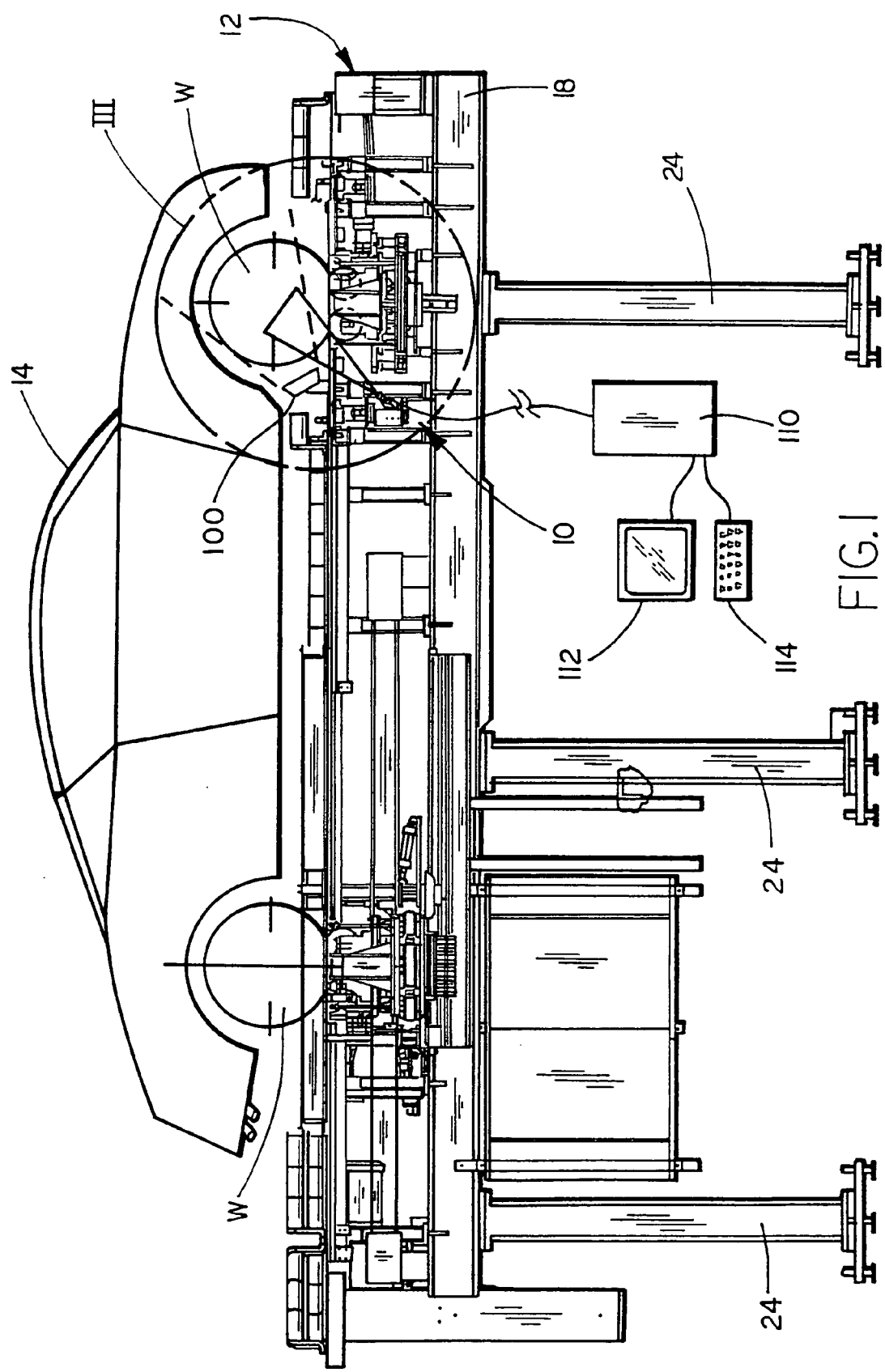
FIG. 1 is a side elevation of a vehicle alignment machine for measuring and setting the wheel alignment of a vehicle supported thereon, the alignment machine including the caster angle measurement system of the present invention.
Figure 2:
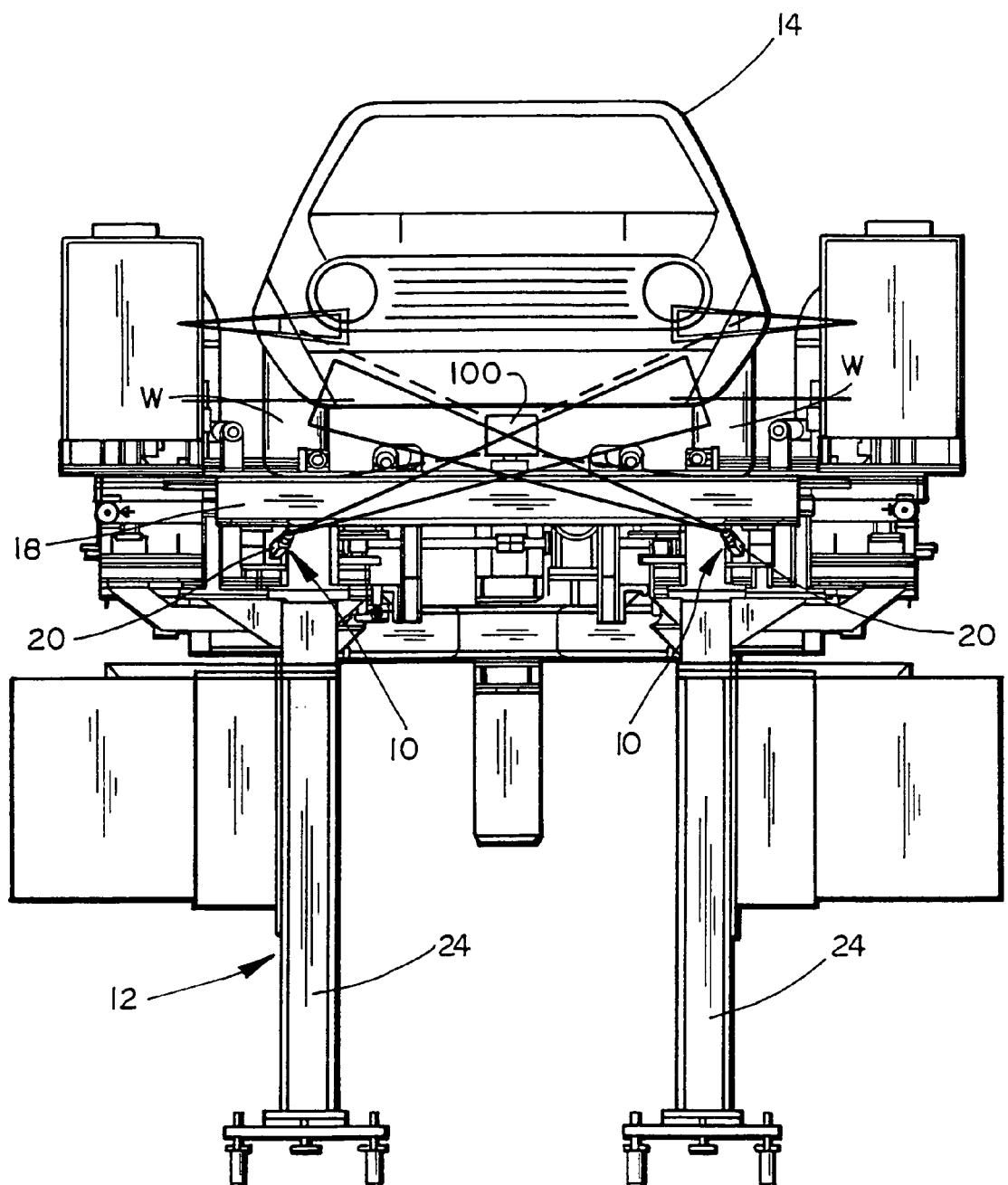
FIG. 2 is a front elevation of the vehicle alignment machine incorporating the caster angle measurement system of the present invention.
Figure 3:
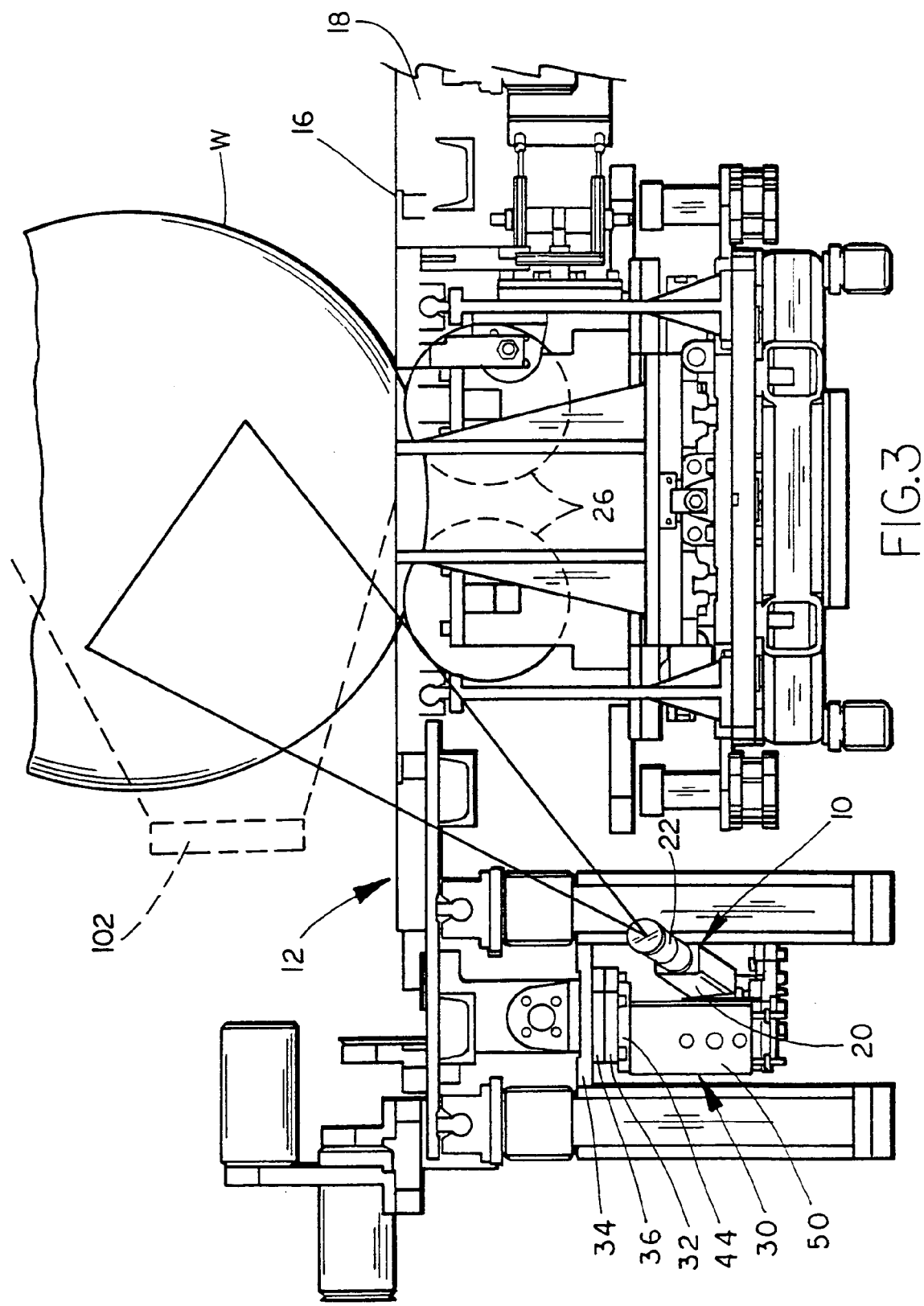
FIG. 3 is an enlarged view of a portion of the vehicle alignment machine incorporating the caster angle measurement system of the present invention in area III of FIG. 1.
Figure 4:
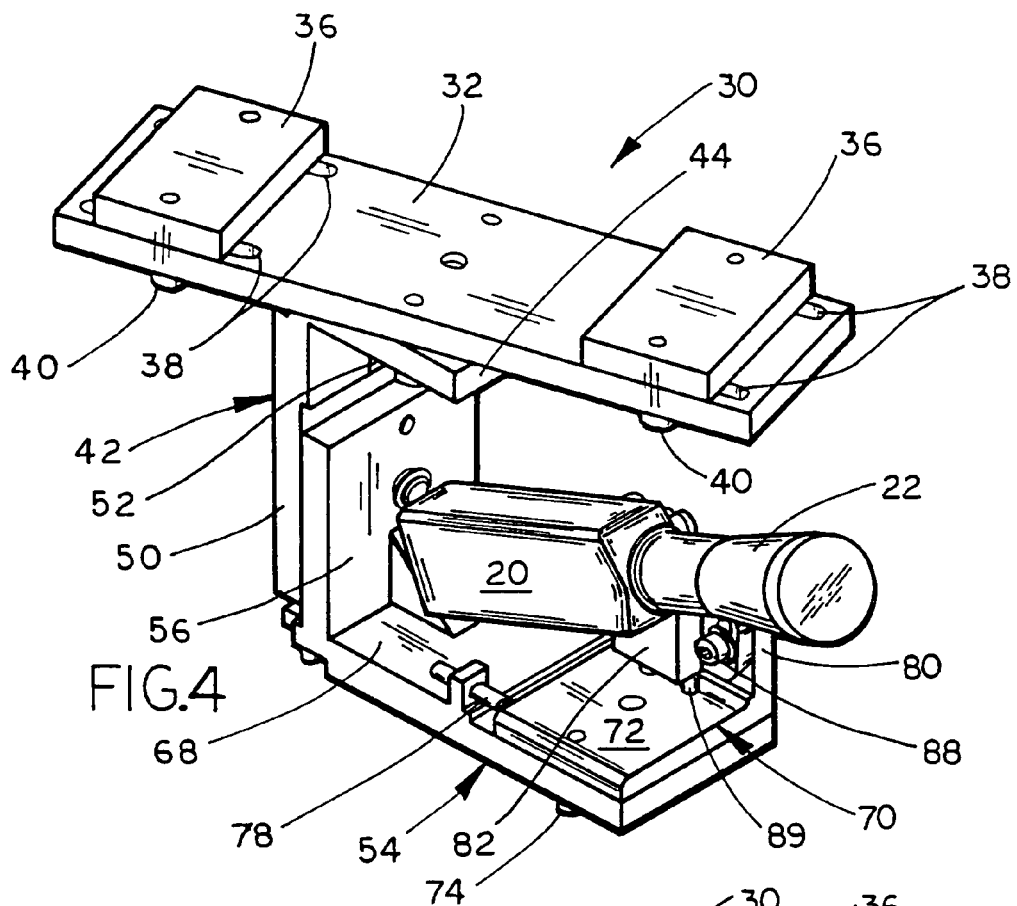
FIG. 4 is a top, right side perspective view of the camera support including a video camera for use in the present invention.
Figure 5:
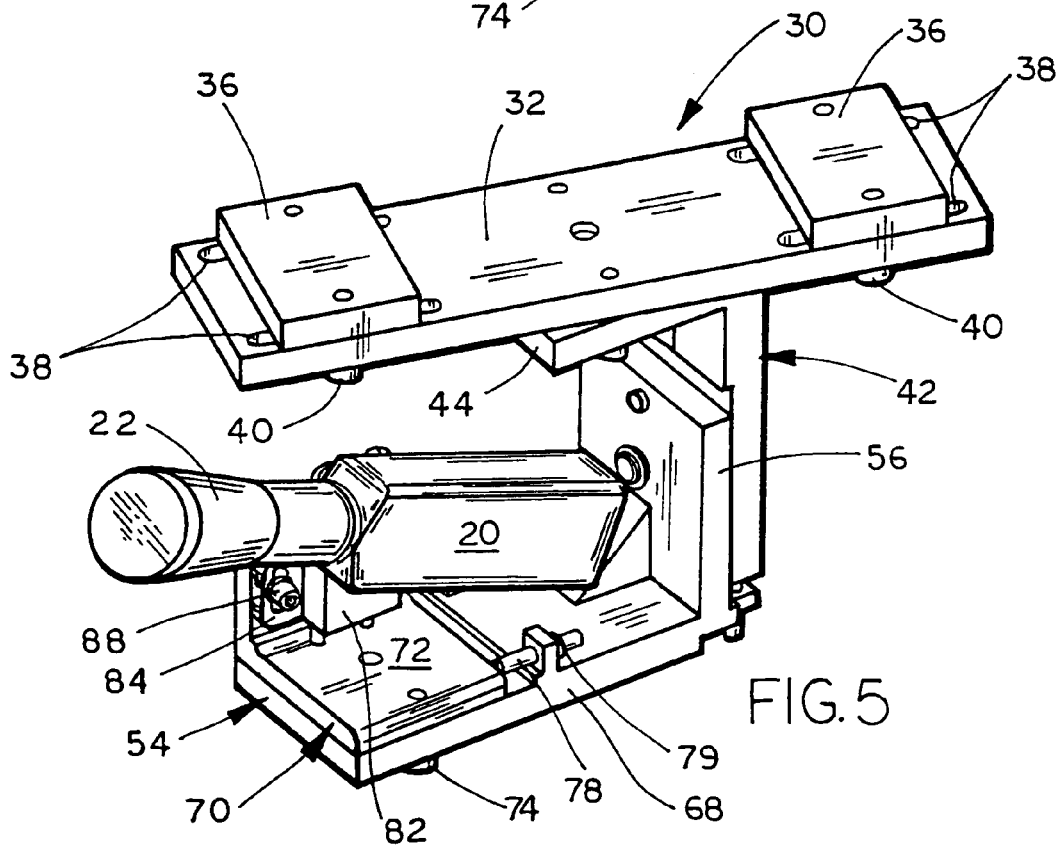
FIG. 5 is a top left side view of the camera support and video camera of the present invention.
Figure 6:
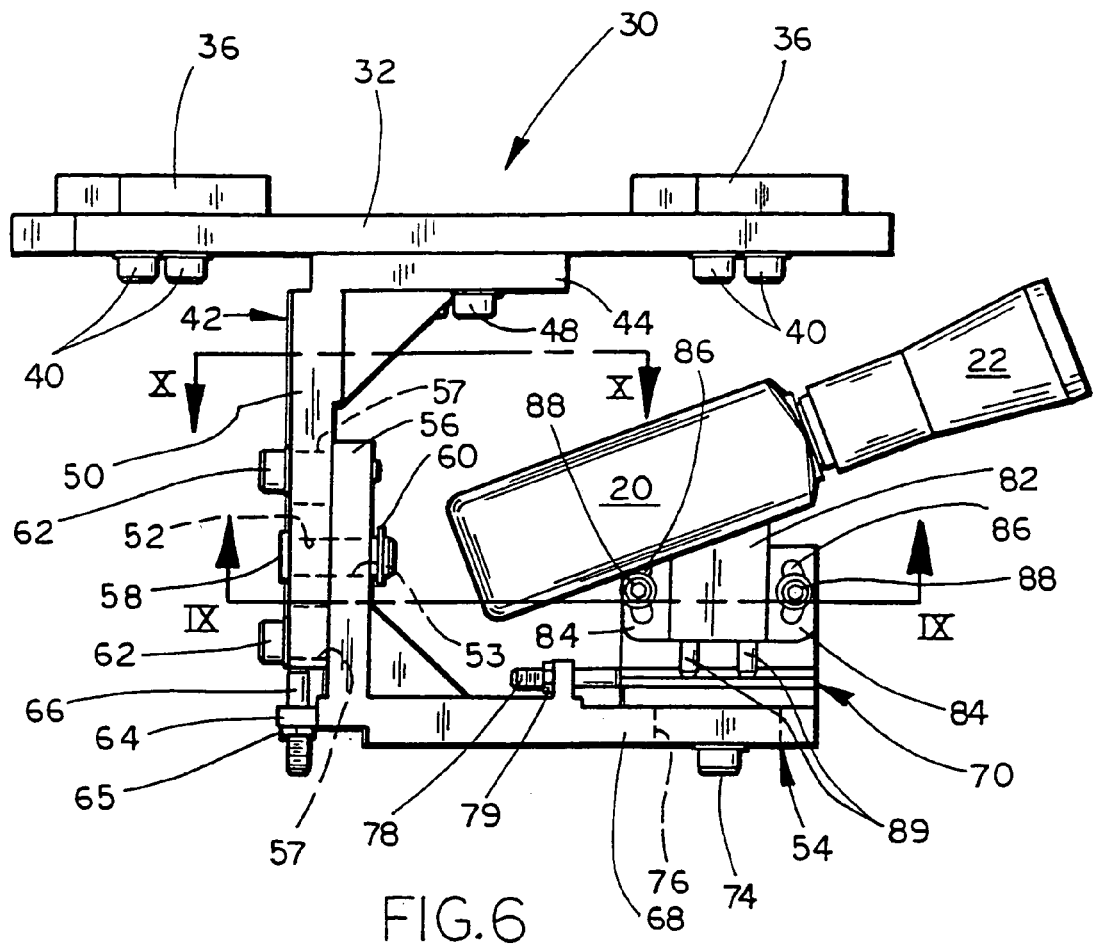
FIG. 6 is a right side elevation of the camera support and video camera of the present invention.
Figure 7:
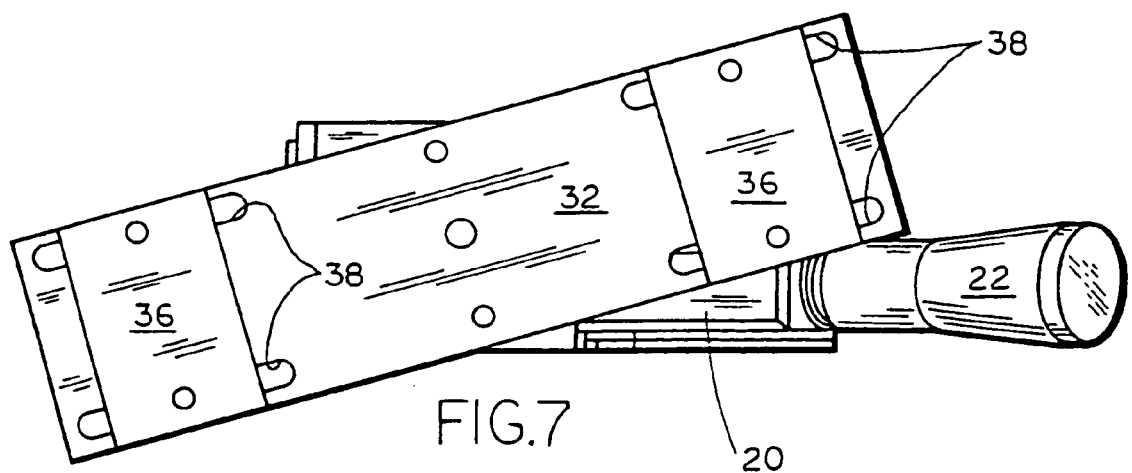
FIG. 7 is a top plan view of the camera support and video camera of the present invention.
Figure 9:
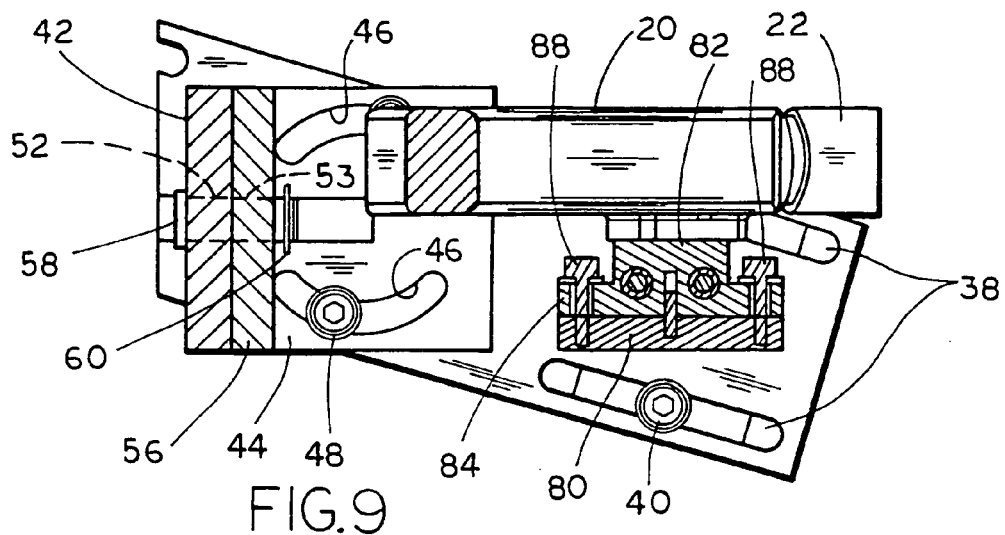
FIG. 9 is a sectional view of the camera support and video camera taken along plane IX-IX of FIG. 6.

Referring now to the drawings in greater detail, FIGS. 1-3 illustrate a preferred embodiment of the non-contact caster angle measurement system 10 of the present invention incorporated in a vehicle alignment machine 12 which supports a vehicle 14 for various alignment functions. As shown in FIGS. 1 and 2, alignment machine 12 preferably includes a pair of the caster angle measurement systems 10 each including an image capture device such as a video camera 20 having a lens 22 and supported on an adjustable image capture device support such as a camera support 30 (FIG. 3). Preferably, each caster angle measurement system 10 is supported below the top surface 16 above which vehicle 14 is supported on alignment machine 12 with the cameras 20 positioned on supports 30 for viewing upwardly and across the machine toward the opposite side to the inside surface of the opposing vehicle wheel assembly as shown in FIG. 2. In addition, measurement system 10 includes one or more light sources 100 adapted to illuminate the inside surface of both of the steerable front wheel assemblies of the vehicle 14 to enable proper viewing thereof by the image capture devices or cameras 20. Each image capture device or video camera 20 preferably includes or is connected to a computer-based control 110 such as a processor, programmable control, PC (personal computer), microprocessor or the like to which a video monitor 112 and a suitable data entry/interface device such as keyboard or keypad 114 may be connected (FIG. 1). When positioned as shown in FIGS. 1-3, each image capture device or video camera 20 will have its lens 22 focused on the inside of the opposing front, steerable wheel assembly thereby viewing the wheel mounting and steering assembly, sometimes known as the steering knuckle, including portions of the front suspension elements. A typical view of one such assembly is shown in FIG. 11. The video camera captures an image of the wheel mounting and steering assembly including predetermined physical portions thereof which enable the computer-based control to determine the angle of such physical features with respect to the position of the image capture device or camera and, given the fixed relationship of that physical feature or features to the steering axis for the particular wheel assembly and vehicle being inspected based on manufacturer's specifications, can also calculate and determine the caster angle of the steering axis as will be more fully described below.

As shown in FIGS. 1-3, the vehicle alignment machine 12 on which the caster angle measuring system of the present invention 10 is preferably mounted is a conventionally known machine of the type sold by Burke E. Porter Machinery Company of Grand Rapids, Mich., under Model No. 7000 NCA, 7200 NCA or 6000 NCA which accommodates both cars and light trucks having varying wheel bases to enable measurement of suspension height, frame angle, wheel toe-angle and camber. If desired, integrated headlight aiming systems may also be included. One form of machine 12 is shown and described in U.S. Pat. No. 6,070,332, assigned to the same assignee as the present invention, the disclosure of which is hereby incorporated by reference herein. When the measurement system 10 of the present invention is added to machine 12 as an improvement, caster angle can also be measured.

Machine 12 includes a frame 18 having top surface 16 and supported on a series of support legs 24 above a support surface sufficient to allow human operators to move freely underneath the frame 18. Each machine 12 typically includes four pair of tire support rollers 26, two pair on each side of the machine, one for a rear tire and one for a front tire on each vehicle side. Typically, one of the rollers 26 in each pair is driven by an appropriate drive mechanism to rotate tires and wheels W (FIG. 3) to enable proper measurement and adjustment for alignment purposes. However, the present caster angle measurement system is typically operated when wheels and tires W are at rest on rollers 26.

With reference to FIGS. 3 and 4-10, each of the two image capturing video cameras 20 is supported on a camera support assembly 30 enabling the camera to be adjusted about three axes to properly focus on and view the inside of a vehicle wheel mounting and steering assembly of the type shown in FIG. 11 when illuminated by light source 100. Camera support assembly 30 preferably enables camera 20 to be adjusted on three mutually perpendicular axes and includes a top plate 32 secured to the underside of a downwardly projecting mounting support 34 on alignment machine 12 (FIG. 3) by means of spaced weld pads or mounting blocks 36. Mounting blocks 36 are preferably welded to the underside of support 34. Top plate 32 includes two pair of spaced, parallel slots 38, one pair at each end of the top plate through which are secured bolts 40 enabling top plate 32 to be adjusted longitudinally with respect to blocks 36. Secured to the underside of top plate 32 is an L-shaped mounting plate 42 having a top flange 44 including curved, circumferential slots 46 (FIG. 9) through which bolts 48 are received to allow rotational movement of mounting bracket 42 when the bolts are loosened. Downwardly extending flange 50 of bracket 42 includes a central aperture 52 (FIGS. 6, 9 and 10) and arcuate slots 57 concentric with aperture 52 that are adapted to allow adjustable, pivotal mounting of an L-shaped bottom bracket 54. Bracket 54 includes an upwardly extending mounting flange 56 including an aperture 53 aligned with aperture 52 in flange 50. A headed pivot pin 58 passes through aligned apertures 52, 53 and receives a securing clip 60 on its inside end adjacent flange 56 to retain it in place. Bolts 62 pass through arcuate slots 57 and are threaded into apertures in flange 56 to secure flange 56 in a desired rotational position on the inside surface of flange 50. Adjustment pins 66 are threaded through extending flanges 64 on mounting flange 56 and secured with stop nuts 65. Pins 66 engage the end surface of mounting flange 50 to allow precise, fine adjustment of the rotational position of bracket 54 when rotated.

Figure 8:
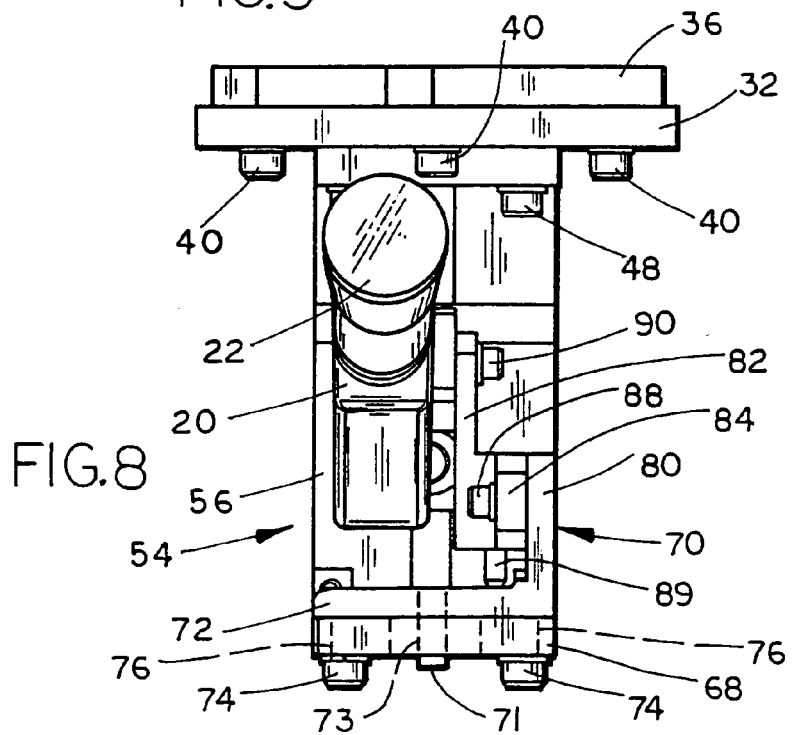
FIG. 8 is a front elevation of the camera support and video camera of the present invention.
Figure 10:
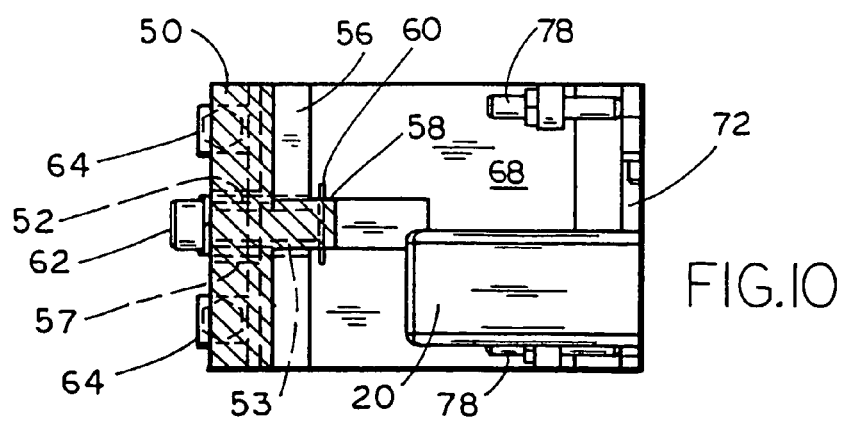
FIG. 10 is a sectional plan view of the camera support and video camera taken along plane X-X of FIG. 6.

Bracket 54 also includes a generally horizontal flange 68 having a top surface on which camera mounting bracket 70 is pivotally secured by pivot pin 71 in a central aperture 73 (FIG. 8). Camera mounting bracket 70 includes a horizontal flange 72 secured by bolts 74 passing through a pair of arcuate slots 76 in horizontal flange 68 which are similar to slots 46 and 57 and are concentric with pin 71 and aperture 73 to secure flange 72 in a desired rotational position on flange 68. Threaded adjustment pins 78 and stop nuts 79 allow precise, fine adjustment of the rotational position of bracket 70 in a manner similar to adjustment pins 66. Bracket 70 also includes a vertically extending flange 80 to which is secured a T-shaped camera mounting plate 82. Camera mounting plate 82 includes laterally extending ears or flanges 84 at its lower end, each flange 84 including an arcuate slot 86. Mounting bolts 88 are received through slots 86 for securing the camera mounting plate to the inside surface of vertical flange 80 of camera mounting bracket 70. When bolts 88 are loosened, the upper end of camera mounting plate 82 may be rotated toward and away from mounting bracket 42 to position the camera 20 which is mounted on plate 82 by means of bolt 90. Threaded pins 89 allow fine adjustment of the rotational position of plate 82.

Accordingly, camera support 30 allows linear movement and adjustment of camera 20 on a first axis by means of bolts 40 passing through slots 38 in top plate 32 into blocks 36. Rotational movement about a second axis which is perpendicular to the first axis is provided by bolts 48 in slots 46 of flange 44 with respect to top plate 32. Rotational movement of camera 20 about a third axis that is perpendicular to the second axis is provided by means of guide pin 58 and bolts 62 in arcuate slots 57 of mounting flange 50 of bracket 42. Rotational movement about a fourth axis of camera mounting bracket 70 that is parallel to the second axis and perpendicular to the third axis is provided by pin 71 and bolts 74 in arcuate slots 76 of flange 68. Rotational movement about a fifth axis that is perpendicular to the fourth axis is provided by bolts 88 in slots 86 in flanges 84 of camera mounting plate 82.

As will be understood from FIG. 2, when cameras 20 are positioned on supports 30 below top surface 16 on frame 18 as shown, they preferably include fields of view which extend across and under vehicle 14 toward the opposite side of the vehicle for viewing the opposite wheel assembly. Thus, the video camera on the left side of the alignment machine views across and under the vehicle toward the right front wheel assembly. Likewise, the right-hand video camera on the alignment machine views across and under toward the left-hand wheel assembly. In these positions, cameras 20 preferably have fields of view which cross one another near the center of the machine as will be understood from FIG. 2.

With reference again to FIGS. 1-3, light source 100 is preferably mounted at the center of alignment machine 12 on top surface 16 and includes suitable light sources to provide a field of illumination extending laterally outwardly from either side of the light source toward the inside of the front wheel assemblies of vehicle 14 as shown in phantom in FIGS. 1 and 2. Preferably, light source 100 includes a pair of spotlights formed from a plurality of light emitting diodes emitting red light in the indicated field of view. Since the preferred video camera 20 is black and white, it has been found that red light as provided by these LEDs provides a better image with cameras 20 because of the peak response of the camera. Preferably, the spotlights providing a plurality of light emitting diodes are available from Spectrum Illumination of Muskegon, Mich., under Model No. SP 5.5 and include some eighteen light emitting diodes emitting light along a generally common direction and arranged in two concentric rows of LEDs.

Alternate light sources may also be used such as incandescent lights or halogen lights. Alternately, as shown in FIG. 3, a light source 102 (shown in phantom in FIG. 3) is positioned to the rear, and inside of front wheel assembly W and above surface 16 of machine 12 such that the wheel mounting and steering assembly on the inside of the wheel is fully illuminated. In this case, a suitable mechanism for lowering the light source 102 below top surface 16 of alignment machine frame 18 is provided to allow vehicle 14 to be driven onto machine 12 after which light source 102 is raised above top surface 16 to the position shown in FIG. 3 for proper illumination of the inside of wheel W. In this case, two light sources 102 would be provided, one on each side of machine 12 adjacent each of the front wheel assemblies in the described position.

Yet, another alternate position for suitable light sources is adjacent cameras 20 on support 30 or machine 12 such that a field of illumination coextensive with the each camera field of view is provided.

Preferably, video cameras 20 are each closed circuit, black and white, CCD-type video cameras or sensors such as those sold by Cognex Corporation of Natick, Mass., under Model No. ISS-4001-00. Each camera 20 is preferably a high resolution vision sensor suitable for applications requiring increased resolution both for inspecting small parts and capturing images of larger parts and providing rapid reset, progressive scan, full frame and partial frame integration.

As mentioned above, each camera 20 is connected to a computer-based control 110 (FIG. 1), which may be connected to a video monitor or output 112 and a data entry/interface such as keyboard or keypad 114. Preferably, computer-based control 110 is provided as a separate unit, one for each camera 20 on each side of machine 12. Alternately, both cameras 20 can be connected to the same computer-based control that may be included as a control unit for the alignment machine 12, if desired. A further alternative is to utilize a microprocessor or programmable computer that may be included within the video camera itself.

Before using the non-contact caster angle measurement system 10 of the present invention, each video camera 20 is preferably calibrated in a one-time procedure prior to operation of the system to find the relation between the camera vertical axis and the true vertical axis. For example, calibration can be accomplished by using a master gauge (not shown) mounted on machine 12 within the field of view of the camera. A suitable master gauge would include a plate having horizontal and vertical, aligned black, circular dots. The camera is programmed to find the horizontal and vertical rows of dots, calculate the center of each dot and determine a vertical and horizontal line through the center of those dots. The angle of these lines, as compared to the optical axis of the camera, is the calibrated offset used for further calculations in the non-contact caster angle measurement system.

Following calibration of the video cameras 20, caster angle measurement system 10 may then be operated. First, vehicle 14 is driven onto wheel alignment machine 12 into the position shown in FIGS. 1 and 2 supported by rollers 26. Machine 12 centers the vehicle, retracts the access floors, and starts rollers 26 to initiate rotational movement of the tires and wheels. The wheel alignment machine thereafter measures the camber and the toe of the front wheel assemblies in a conventional manner to allow adjustment if necessary. After the alignment cycle is competed, rollers 26 are stopped while the vehicle stays centered. The alignment machine 12, which is connected to computer-based control 110, transmits vehicle information to computer 110 regarding the specific vehicle type and the wheel assembly features to be viewed by cameras 20. Alternately, the manufacturer's specifications for the wheel assembly can be separately programmed into and stored in control 110. For example, the information provided on the specific vehicle could identify a line, such as line 136 in FIG. 11, which is preformed and positioned on the inside surface of the wheel preferably in a more vertical orientation than horizontal. Alternately, the provided vehicle information could identify at least one and preferably two or more physical features on the wheel mounting and steering assembly, known as a steering knuckle, such as a pair of holes or bolts 134 (FIG. 11)

preferably along a vertical or horizontal axis. The image capturing video cameras then identify the preselected features 134 or preformed line 136 using conventionally known vision identifying tools such as pattern finding, blob, contour, circle finder, high, low and/or band pass filters. These image identification and enhancing features or tools allow the cameras to identify the line or physical features on the wheel assembly. In the event that two physical features are used, the video camera transmits information for a virtual or imaginary line extending between the two physical features 134 to the computer control or microprocessor 110. Alternately, if video camera 20 identifies a preformed line, such as line 136, on the wheel assembly, the location of that line is transmitted to the computer. Computer 110 includes software, such as digital pattern recognition software of the type known in the machine vision art, that is programmed to determine the angle of the line from the image information transmitted to the computer by the video camera with respect to the calibrated position of the video camera using the calibrated offset obtained in the calibration steps set forth above. The software also compensates for the off-axis position of the video camera as compared to the wheel axis, such as the distance behind and below the wheel axis as shown in FIGS. 1-3. Subsequently, the computer accesses stored information or information obtained from the wheel alignment machine typically provided by the vehicle manufacturer as to the specific location and relationship of the physical features or line on the wheel assembly and its fixed angular relationship to the steering axis of the wheel assembly. The software of programmable computer 110 or the computer of the wheel alignment machine is programmed to thereafter determine the caster angle of the steering axis of the wheel assembly from the angle of the line and the angular relationship of the line to the steering axis based on the information provided on the specific vehicle previously stored or available to the computer. The resulting caster angle can then be compared to the desired angle provided by the vehicle manufacturer and provided as video output data for adjustment if necessary or later audit. If necessary, eccentric bolts in the vehicle suspension linkage may be rotated by the operator to adjust the caster of the wheel assembly thereby adjusting and changing the caster angle within the tolerance of the desired angle range provided by the manufacturer.

It has been found that the measurement error using video cameras 20 can be reduced by moving the position of the video cameras closer to the wheel center or rotational axis while maintaining a field of view including the inside of the opposing wheel assemblies. Also, rotation of the wheel on its pivot or steering axis such that the normal of the plane of the wheel aligned toward the camera viewing axis can also reduce measurement error.

As shown in FIG. 11, a typical view of the inside of a front, steerable wheel assembly W on a vehicle mounted on machine 12 is illustrated. In this case, the left-hand video camera views toward the right or passenger side wheel assembly and provides an image of wheel W including wheel rim R and wheel mounting and steering assembly 120. Wheel mounting and steering assembly 120 includes front wheel drive shaft or half shaft 122, if the vehicle includes front wheel drive, lower control arm 124 and upper control arm 126. Lower control arm 124 supports the lower end of shock absorber and spring assembly 128. A steering knuckle or wheel mounting plate 132 includes the lower end 131 of wheel pivot or steering axis 130 (FIGS. 11 and 12), as well as a variety of physical features thereon including a pair of bolts 134 through which a virtual or imaginary line extends at an angle slightly offset from the vertical as shown in FIG. 12. Alternately, instead of physical features such as bolts 134, a preformed line 136 formed by machining, etching or scribing on steering knuckle or plate 132 may alternately be viewed by the video camera. The image captured by video camera 20 is relayed or transmitted to computer 110 where a digital pattern recognition program of the type known in the machine vision art is utilized to determine the location of the virtual line through bolts 134 or preformed line 136 in relation to the calibrated offset of the video camera. The angle between the calibrated position of the video camera and the virtual line through bolts 134 or actual preformed line 136 (angle A in FIG. 12) is determined from the image information transmitted from the video camera to computer or processor 110. Based on stored information concerning the specific vehicle and the angular relationship between the virtual line between bolts 134 or preformed line 136, for example, and the position of the steering axis 130 from the known vehicle information stored in the computer, the caster angle B in FIG. 12 may be determined for use by the operator of machine 12. In the event it is determined that caster angle B is not set to manufacturer specifications, eccentric bolts 138 may be rotated in equal and opposite directions to translate the lower end 131 of wheel pivot or steering axis 130 longitudinally, thereby moving the steering axis 130 and changing caster angle B as desired.

Accordingly, the present invention allows measurement of the caster angle for steerable wheel assemblies with a stationary image capture device in a rapid, efficient manner without contact with the wheel assembly by recognizing one or more physical features on the wheel mounting and steering assembly and determining the angle of a preformed line or virtual line through such features with respect to known information stored or accessible in the computer to calculate the caster angle for the specific vehicle. It will be understood that computer 110 or the computer used by the alignment machine 12 for operating the present system may include specific vehicle information for a wide variety of vehicles to be tested and measured with machine 12 and caster angle measurement system 10. Each set of specific vehicle information will provide the general locations and details of the physical features to be viewed and recognized by the image capturing video cameras to enable calculation of the caster angle and comparison with the manufacturer specifications.

While several forms of the invention have been shown and described, other forms will now be apparent to those skilled in the art. Therefore, the embodiments shown in the drawings and described above are not intended to limit the scope of the invention as defined by the claims which follow as interpreted under the principles of patent law.

The embodiments in which an exclusive property or privilege is claimed are as follows:

1. An apparatus for measuring the caster angle of the steering axis of a wheel assembly of a vehicle, said apparatus comprising:
    an image capture device;
    a support for mounting said image capture device for viewing a wheel mounting and steering assembly for a wheel of the vehicle when the wheel mounting and steering assembly is located adjacent the inside surface of the vehicle wheel assembly and beneath the vehicle;
    a light source, said light source positioned to illuminate the wheel mounting and steering assembly for the wheel viewed by said image capture device; and
    at least one computer-based control connected to said image capture device;

said image capture device being positioned to view at least one physical feature on the wheel mounting and steering assembly adjacent the inside surface of the wheel assembly when illuminated with light from said light source and providing information concerning the position of the at least one physical feature to said control, said control including software programmed to determine the position of the physical feature from said information and to determine the caster angle of the steering axis from that position of the physical feature.

2. The apparatus of claim 1 wherein said support is adjustable whereby the position of said image capture device may be changed for viewing different areas of the wheel mounting and steering assembly and a wheel mounting and steering assembly of different vehicles.

3. The apparatus of claim 2 wherein said support is mounted below the vehicle to allow said image capture device to view the wheel assembly from a position between vertical planes including the sides of the vehicle.

4. The apparatus of claim 3 wherein said support is adjustable on at least three axes.

5. The apparatus of claim 4 wherein said support is linearly adjustable along a first axis, is rotatable about a second axis perpendicular to said first axis, is rotatable about a third axis perpendicular to said second axis, is rotatable about a fourth axis perpendicular to said third axis, and is rotatable about a fifth axis perpendicular to said fourth axis.

6. The apparatus of claim 5 wherein said image capture device is a video camera; said support adapted to mount said video camera.

7. The apparatus of claim 1 wherein said image capture device is a video camera.

8. The apparatus of claim 7 wherein said video camera is a CCD camera.

9. The apparatus of claim 1 wherein said light source is selected from the group including an incandescent light, a halogen light, and at least one light emitting diode.

10. The apparatus of claim 1 wherein said light source includes at least one light emitting diode.

11. The apparatus of claim 10 wherein said light source is at least one red light emitting diode.

12. The apparatus of claim 1 wherein said light source includes a plurality of light emitting diodes positioned to emit light generally in a common direction.

13. The apparatus of claim 1 wherein the at least one physical feature on the wheel mounting and steering assembly is a line comprising at least one of 1) a line formed in a predetermined position on the wheel mounting and steering assembly, and 2) a virtual line extending between at least two predetermined physical features on the wheel mounting and steering assembly; said software being programmed to determine the angle of the line with respect to the position of said video camera.

14. The apparatus of claim 13 wherein said control is programmed to include the fixed angular relationship of the line on the wheel mounting and steering assembly to the steering axis of the wheel assembly, said software also being programmed to determine the caster angle of the wheel assembly from the angle of the line and the angular relationship of the line to the steering axis.

15. The apparatus of claim 1 wherein said image capture device, said support and said light source are mounted on a vehicle alignment machine adapted to receive and support a vehicle thereon.

16. The apparatus of claim 15 wherein said vehicle alignment machine includes a frame for supporting a vehicle at a predetermined position above a support surface; said image capture device and support being mounted on said vehicle alignment machine below said predetermined position for viewing the wheel mounting and steering assembly from below said predetermined position and the vehicle.

17. The apparatus of claim 16 including a pair of image capture devices, each image capture device being a video camera, each video camera being mounted on a respective support; a first of said video cameras being mounted adjacent a right side of said frame for viewing a wheel mounting and steering assembly on the left side of the vehicle; the second of said video cameras being mounted adjacent the left side of said frame for viewing a wheel mounting and steering assembly on the right side of the vehicle.

18. The apparatus of claim 17 wherein each video camera has a field of view extending across the field of view of the other video camera.

19. A method for measuring the caster angle of the steering axis of a wheel assembly of a vehicle, the wheel assembly including a wheel mounting and steering assembly located adjacent the inside surface of the wheel assembly and beneath the vehicle, said method comprising:
providing an image capture device;
illuminating the wheel mounting and steering assembly of the vehicle wheel assembly with a light source;
positioning said image capture device to view the wheel mounting and steering assembly when the wheel mounting and steering assembly is adjacent the inside surface of the wheel assembly;
viewing at least one predetermined physical feature on the wheel mounting and steering assembly adjacent the inside surface of the wheel assembly with said image capture device when the feature is illuminated with light from said light source;
determining the position of the physical feature and the caster angle of the steering axis from an output of said image capture device.

20. The method of claim 19 wherein said physical feature comprises a line; said method further including determining the angle of said line with respect to the position of said image capture device.

21. The method of claim 20 including viewing a line formed at a predetermined position on the wheel mounting and steering assembly.

22. The method of claim 20 including viewing at least two predetermined physical features on the wheel mounting and steering assembly, said line comprising a virtual line extending between said at least two physical features.

23. The method of claim 20 including providing the fixed angular relationship of said line on the wheel mounting and steering assembly to the steering axis of the wheel assembly, and determining the caster angle of the wheel assembly from the angle of the line and the fixed angular relationship of the line to the steering axis.

24. The method of claim 23 including transmitting information concerning the position of said line to a computer-based control, determining the position of said line from said transmitted information, storing the fixed angular relationship of said line to said steering axis of the wheel assembly in said computer-based control, and determining the caster angle of the wheel assembly from the determined angle of said line and said stored angular relationship of said line to said steering axis with said computer-based control.

25. The method of claim 19 including storing the angular relationship of said at least one physical feature on the wheel mounting and steering assembly to the steering axis of the wheel assembly on a computer-based control, and determining the caster angle of the wheel assembly from the angle of said at least one physical feature and the stored relationship of said at least one physical feature to the steering axis with said computer-based control.

26. The method of claim 19 including positioning said image capture device below the vehicle and viewing the illuminated wheel mounting and steering assembly from below the vehicle.

27. The method of claim 26 including positioning one image capture device adjacent one side of a vehicle, and viewing a wheel assembly on the opposite side of the vehicle.

28. The method of claim 27 including positioning a second image capture device adjacent the opposite side of the vehicle and viewing a wheel assembly on the one side of the vehicle.

29. The method of claim 28 including positioning said image capture devices to view wheel assemblies on opposite sides of the vehicle such that the fields of view of said image capture devices extend across one another.

30. The method of claim 26 including positioning a video camera below the vehicle and viewing said illuminated wheel mounting and steering assembly with said video camera from below the vehicle.

31. The method of claim 30 including storing the angular relationship of said at least one physical feature on the wheel mounting and steering assembly to the steering axis of the wheel assembly on a computer-based control, and determining the caster angle of the wheel assembly from the angle of said at least one physical feature and the stored relationship of said at least one physical feature to the steering axis with said computer-based control.

* * * * *